United States Patent
Stender et al.

(10) Patent No.: US 6,183,030 B1
(45) Date of Patent: Feb. 6, 2001

(54) CONVERTIBLE REAR STRUCTURE FOR A MODULAR VEHICLE BODY

(75) Inventors: Mark Wayne Stender; John Pestenariu, both of Dearborn, MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/103,513

(22) Filed: Jun. 23, 1998

(51) Int. Cl.⁷ ................... B60R 13/01; B60J 7/20
(52) U.S. Cl. .................. 296/39.1; 296/107.08; 296/195; 296/124; 296/186
(58) Field of Search ............ 296/107.01, 107.08, 296/37.1, 37.8, 37.16, 136, 186, 901, 196, 39.1, 38, 195, 197, 124

(56) References Cited

U.S. PATENT DOCUMENTS

| | | | |
|---|---|---|---|
| 3,143,373 | 8/1964 | Fordyce | 296/107 |
| 3,415,568 | * 12/1968 | Gugelot et al. | 296/31 |
| 4,533,172 | * 8/1985 | Oliver | 296/185 |
| 4,836,600 | 6/1989 | Miyazaki et al. | 296/197 |
| 4,914,802 | * 4/1990 | Takao et al. | 29/469 |
| 5,035,461 | * 7/1991 | Zweigart | 296/107 |
| 5,171,054 | 12/1992 | Wilson | 296/37.16 |
| 5,288,356 | 2/1994 | Benefiel | 156/196 |
| 5,314,230 | 5/1994 | Hutchison et al. | 296/203 |
| 5,395,152 | 3/1995 | Skornicka et al. | 296/124 |
| 5,509,712 | 4/1996 | Rausch et al. | 296/124 |
| 5,527,081 | 6/1996 | Rausch et al. | 296/107 |
| 5,788,322 | * 8/1998 | Wolf et al. | 296/186 |
| 5,806,915 | * 9/1998 | Takabatake | 296/187 |
| 5,876,083 | * 3/1999 | Striegl | 296/37.1 |

* cited by examiner

*Primary Examiner*—D. Glenn Dayoan
*Assistant Examiner*—Patricia Engle
(74) *Attorney, Agent, or Firm*—Gregory P. Brown

(57) ABSTRACT

A convertible rear structure for a modular vehicle body includes a floor panel, a rear panel projecting upwardly from the floor panel, a front panel projecting upwardly from the floor panel and joining the rear panel to form a trough like region therebetween, and a seat back panel projecting downwardly from the front panel, thereby forming a rear structure that is adapted to receive convertible top componentry prior to joining with the modular vehicle body.

12 Claims, 2 Drawing Sheets

CONVERTIBLE REAR STRUCTURE FOR A MODULAR VEHICLE BODY

FIELD OF THE INVENTION

The present invention relates to modular vehicle bodies in general, and more specifically to a convertible rear structure for such bodies.

BACKGROUND OF THE INVENTION

Convertible vehicle tops or vehicle tops that fold back have been used in the automotive vehicle industry for years. The attraction of convertible tops is that they may be raised to cover a passenger compartment of the vehicle during inclement weather and folded down to expose the passenger compartment to an open air environment during periods of fair weather. When folded down, the convertible top is stored in an area behind the back seat and in front of the trunk of the vehicle.

Conventional unitized vehicle bodies use steel stampings for the unibody structure necessary to carry the convertible componentry and form the convertible storage area. The convertible componentry includes the cover as well as various hydraulic and electronic equipment necessary to actuate the cover. One problem with unitized bodies having convertible tops is that the components must be added to the vehicle on the assembly line. The components and their resulting assemblies, therefore, must be tested on the assembly line, which can slow the manufacturing process if the componentry or assemblies should fail. Furthermore, the steel stampings for the unibody structure are necessary to carry the convertible componentry and structurally reinforce the unibody in order to provide vehicle torsional rigidity, thereby adding to overall vehicle cost.

Modular vehicle bodies have been introduced to address the problem of manufacturing slow down resulting from the failure of components added to unitized bodies on the assembly line. Modular vehicle bodies have the advantage of being independent body structures that have componentry added thereto and tested prior to assembly line installation.

What is desired then is a convertible rear structure that allows for assembly of the convertible top componentry to the rear structure, facilitates testing of the assembled componentry prior to joining the structure to the vehicle body and adds torsional rigidity to the vehicle body.

SUMMARY OF THE INVENTION

The present invention overcomes the disadvantages of the related art by providing a convertible rear structure for a modular vehicle body having a floor panel, a rear panel projecting upwardly from the floor panel, a front panel projecting upwardly from the floor panel and joining the rear panel to form a trough like region therebetween, and a seat back panel projecting downwardly from the front panel.

An object of the present invention is to provide a convertible rear structure that allows for assembly of the convertible top componentry to the structure and facilitates testing of the componentry prior to joining the structure to the vehicle body.

An advantage of the present invention is that the rear structure is adapted to receive convertible top componentry prior to joining the structure to the vehicle body.

A feature of the present invention is that the seat back panel and the front panel form a downwardly facing channel adapted to receive a foam core. A foam core received in the channel advantageously reinforces the rear structure as well as the vehicle body once the structure is joined to the vehicle body.

BRIEF DESCRIPTION OF THE DRAWINGS

Other features and advantages of the present invention will become apparent to those skilled in the related arts upon reading the following description with reference to the accompanying drawings, in which.

DETAILED DESCRIPTION OF THE PREFERRED EMBODIMENT

Figure 1:
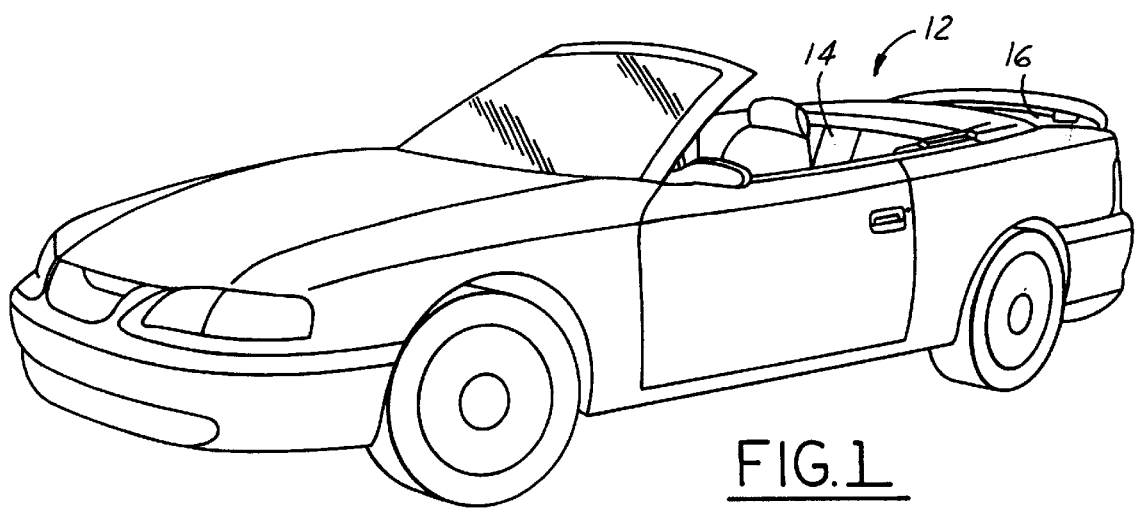
FIG. 1 is a side view of a convertible automotive vehicle according to the present invention.

Turning now to the drawings, and in particular to FIG. 1 thereof, an automotive vehicle 10 with a modular vehicle body is shown having a convertible rear structure 12. The vehicle 10 is shown having a conventional convertible top in a top down position. The rear structure 12 is positioned in the vehicle 10 rearward of the rear seats 14 and forward of the trunk 16.

Figure 2:
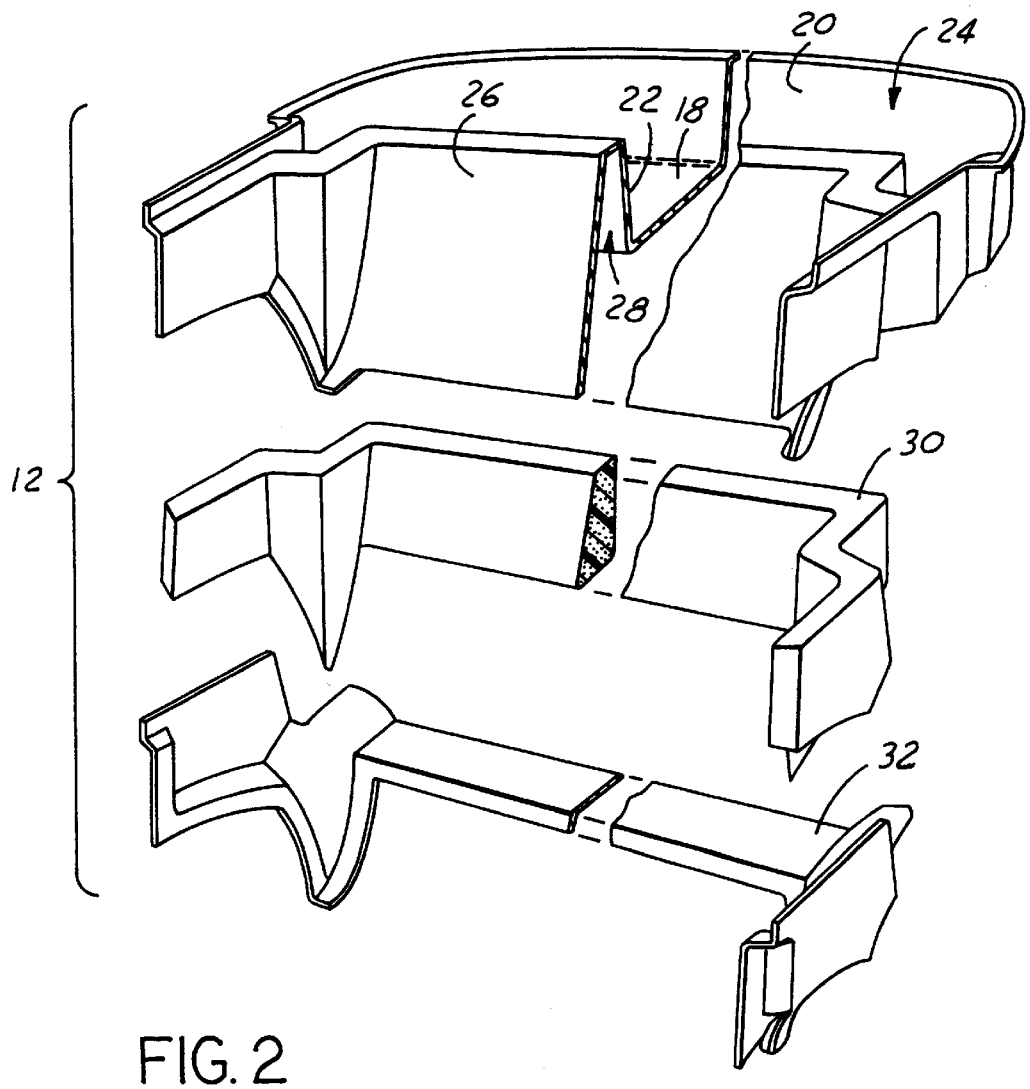
FIG. 2 is an exploded view showing a convertible rear structure for a modular vehicle body according to the present invention.

As shown in FIG. 2, the convertible rear structure 12 has a substantially planar floor panel 18. Projecting upward from the floor panel 18 is a rear panel 20 that is adjacent the trunk 16. The floor panel 18 further has a front panel 22 jutting upward therefrom, opposite from the rear panel 20. The rear and front panels, 20 and 22 respectively, join to form a trough region 24 therebetween. The trough region 24 is adapted to receive the convertible top when in the top down or stowed position. Extending downwardly from the front panel 22 is a seat back panel 26 adjacent the rear seat 14. The front panel 22 and seat back panel 26 form a downwardly facing channel 28 therebetween.

As further shown in FIG. 2, the convertible rear structure 12 also has a foam core 30. The foam core 30 is adapted to be received in the downwardly facing channel 28. The foam core 30 functions to add torsional rigidity to the rear structure 12 and thereby to the modular vehicle body when joined thereto.

Figure 3:
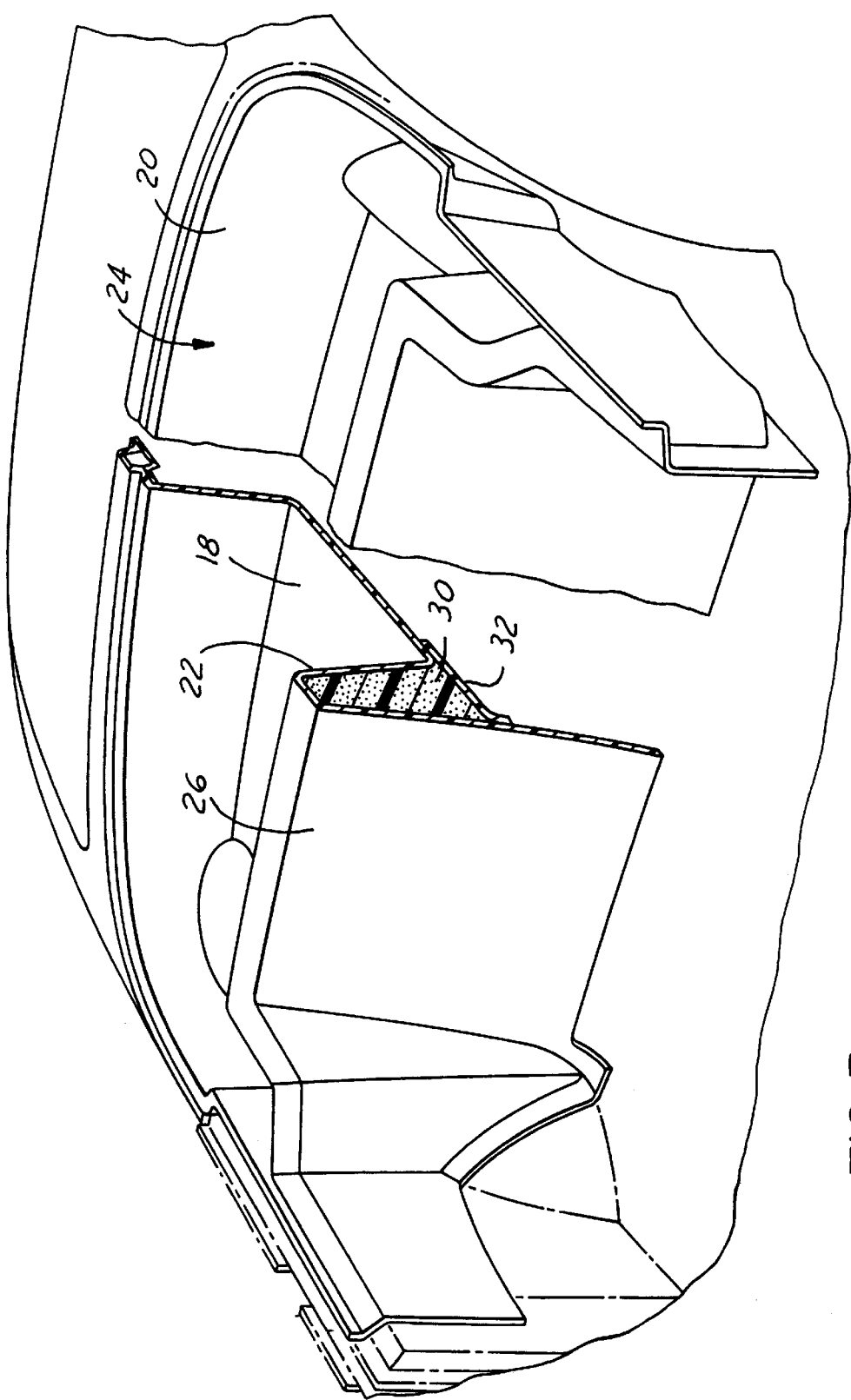
FIG. 3 is a perspective cut-away view of a convertible rear structure joined to a vehicle body according to the present invention.

As also shown in FIG. 2, the convertible rear structure 12 has a lower plate 32. The lower plate is adapted to mate with the rear structure 12 and substantially hermetically enclose the foam core 30 within the downwardly facing channel 28, as best shown in FIG. 3.

The convertible rear structure 12 is preferably manufactured utilizing resin transfer molding or structural reaction injection molding techniques as are known in the art. The upper and lower portions are preferably e-glass type fiberglass having a 3.0 millimeter nominal wall thickness and the foam core 30 is preferably a urethane foam. Once assembled the preform consisting of the upper and lower portions as well as the foam core 30 are resin transfer molded, thereby forming a single rear structural piece. The foam core 30 may be eliminated from this structure if the two pieces are molded separately and then adhesively bonded together. The rear structure 12 is adapted to receive the conventional convertible top componentry such as the convertible top cover, hydraulics and electronics. Once the componentry is assembled on the rear structure and tested, the rear structure 12 is adhesively bonded to the modular vehicle body preferably using a urethane or epoxy structural adhesive. The rear structure 12 is then preferably mechanically fastened to the vehicle body to secure the structure 12 thereto until the adhesive cures. Conventional rapid cure methods, however, may be employed as well. It is further possible to add sound system componentry, seat belt brackets, and rear seats to the rear structure 12 prior to joining the rear structure 12 to the vehicle body without departing from the scope of the present invention.

The present invention advantageously uses the rear structure 12 to receive convertible top componentry prior to joining with the modular vehicle body. The componentry may advantageously be tested prior to joining the structure 12 to the vehicle body. Furthermore, the downwardly facing channel 28 of the rear structure is adapted to receive a foam core 30. The foam core 30 received in the channel advantageously torsionally reinforces the rear structure 12 as well as the vehicle body once the structure is joined to the vehicle body.

Only one embodiment of the convertible rear structure of the present invention has been described. Those skilled in the automotive arts will appreciate that others may be possible without departing from the scope of the following claims.

We claim:

1. A modular convertible rear structure intended for attachment to a vehicle body, comprising:
   a floor panel;
   a rear panel projecting upwardly from the floor panel;
   a front panel projecting upwardly from the floor panel and joining the rear panel to form a trough-like region therebetween; and
   a seat back panel projecting downwardly from the front panel;
   whereby said floor panel, said rear panel, said front panel, and said seat back form the modular convertible rear structure which is adapted to receive convertible top componentry and whereby the modular rear structure is adapted to attach to the vehicle body as an integral structure.

2. A convertible rear structure according to claim 1 wherein the front panel and the seat back panel join to form a downwardly facing channel.

3. A convertible rear structure according to claim 2 wherein the downwardly facing channel has disposed therein a foam core.

4. A convertible rear structure according to claim 3 further having a lower plate adapted to mate with the convertible rear structure and substantially hermetically enclose the foam core thereby.

5. A convertible rear structure according to claim 1 wherein the convertible rear structure is joined to the modular vehicle body using a urethane adhesive.

6. A modular convertible rear structure, comprising:
   a floor panel;
   a rear panel projecting upwardly from the floor panel;
   a front panel projecting upwardly from the floor panel and joining the rear panel to form a trough like region therebetween; and
   a seat back panel projecting downwardly from the front panel to form a downwardly facing channel therebetween;
   whereby said floor panel, said rear panel, said front panel, and said seat back panel form an integral modular convertible rear structure for receiving convertible top componentry prior to attachment of the modular stricture to a vehicle body as a unitary structure.

7. A convertible rear structure according to claim 6 wherein the downwardly facing channel has disposed therein a foam core.

8. A convertible rear structure according to claim 7 further having a lower plate adapted to mate with the convertible rear structure and substantially hermetically enclose the foam core thereby.

9. A convertible rear structure according to claim 6 wherein the convertible rear structure is joined to the modular vehicle body using a urethane adhesive.

10. A modular convertible rear structure, comprising:
    a floor panel;
    a rear panel projecting upwardly from the floor panel;
    a front panel projecting upwardly from the floor panel and joining the rear panel to form a trough like region therebetween; a seat back panel projecting downwardly from the front pane to form a downwardly facing channel therebetween; and
    a foam core disposed in the downwardly facing channel adapted to enhance torsional rigidity of the rear structure;
    whereby said floor panel, said rear panel, said front panel, and said seat back panel form an integral modular convertible rear structure for receiving convertible top componentry prior to attachment of the modular structure to a vehicle body as a unitary structure.

11. A convertible rear structure according to claim 10 further having a lower plate adapted to mate with the convertible rear structure and substantially hermetically enclose the foam core thereby.

12. A convertible rear structure according to claim 10 wherein the convertible rear structure is joined to the modular vehicle body using a urethane adhesive.

* * * * *